Feb. 8, 1938.  C. HUGHES  2,107,442
FEEDING BOTTLE AND DEVICE THEREFOR
Filed May 29, 1936
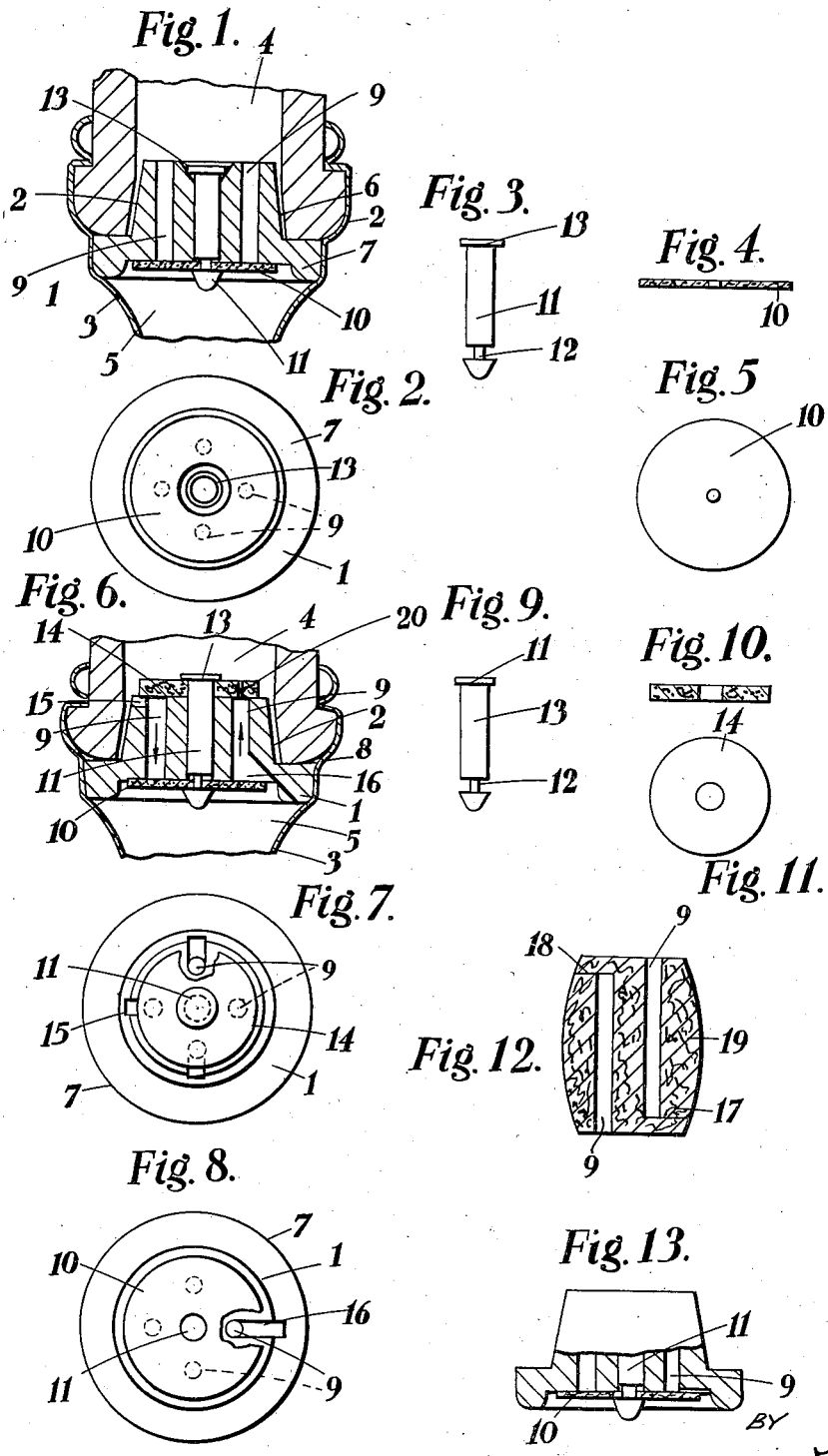
INVENTOR
Cecil Hughes
BY
ATTORNEY Patented Feb. 8, 1938

2,107,442

UNITED STATES PATENT OFFICE 2,107,442

FEEDING BOTTLE AND DEVICE THEREFOR

Cecil Hughes, Tuffley Crescent, Gloucester, England, assignor to Sure Feed Limited, Cardiff, South Wales, a British company Application May 29, 1936, Serial No. 82,570
In Great Britain July 23, 1935

5 Claims. (Cl. 215—11)

This invention relates to feeding bottles and attachments therefor for use by infants, invalids or animals.

In existing methods which employ a teat, the rate of flow of food therefrom is dependent chiefly upon the degree of suction exerted by the recipient and the size of the delivery orifice or orifices in the teat. The size of the said orifice (which word orifice used hereinafter is intended to include one, two or more orifices) when new restricts unduly the rate of food flow, and enlargement to a required accurate dimension in material such as rubber or composition is difficult and uncertain, and moreover, shortens the effective life of the teat.

The present invention has for its object the provision of a novel method of and means for delivering food from a feeding bottle or reservoir of like function by a positive pressure action, together with improved regulation and/or control of the food flow, said action being set up by pressure from the lips and/or mouth of the feeder on the teat as distinguished from the suction hitherto needed. In practice, it is found that, suction being avoided, the infant is free from disorders of the stomach which arise from the intake of air with liquid food into the stomach.

Having the aforesaid and other objects in view as will appear from a perusal of the following description, the invention consists in a feeding bottle or the like or attachment therefor adapted to operate by pressure and comprising a food reservoir and a contractible and expansile chamber formed by an elastic-walled teat fed by gravity from the reservoir, in combination with means for admittance of air to the reservoir and a non-return liquid control device which operates in such manner that when the teat enlarges liquid food enters the teat from the reservoir, and when the teat is contracted food is forced out of the teat delivery orifice by a characteristic pumping action and is prevented from returning to the reservoir.

A further feature of the invention enables the conventional air inlet to be dispensed with, avoids the drawing-in of air with the food, and effects a separation of air and liquid food. In this development there are embodied two one-way devices one for air and one for liquid which operate so that when the teat enlarges, air enters from the atmosphere and liquid food from the reservoir, while when the teat is contracted, air is discharged from the teat into the reservoir and liquid food is delivered from the teat orifice under pressure in the manner described. Thus a device according to the invention pumps or releases air into the bottle and milk or the like from it.

In order that this invention may be clearly understood and readily carried into practice, we have appended hereto an explanatory drawing to which reference may be had and wherein Figures 1 and 2 show one form of device according to the invention, with a single one-way device.

Figures 3, 4 and 5 show separately parts of the assembly depicted in Figures 1 and 2.

Figures 6, 7 and 8 show an embodiment with two one-way devices, and Figures 9, 10 and 11 parts thereof.

Figure 12 illustrates another form of one-way device.

Figure 13 depicts a modification of the arrangement shown in Figure 6, with a fine groove instead of the upper valve.

In Figures 1 and 2 a body fitment is shaped for insertion in or attachment to the mouth of the bottle 2 in any suitable way to divide the space bounded by the bottle and the teat 3 into two chambers 4, 5 conveniently referred to hereinafter as the bottle chamber and the teat chamber. The former acts as a reservoir from which the supply of milk or other liquid food is drawn, while the latter acts as a pumping chamber. In the illustrated form, the body consists of a tapered plug 6 to fit in the bottle mouth and make joint therewith, without or with a flange 7 at the outer part to abut against the outer face of the mouth, the dimensions if desired being such that the flange 7 is or may be surrounded and held in position by the large end 8 of the teat. The joint by which the reservoir is isolated from the teat chamber may alternatively be made by one face of the flange or by the flange part of the teat, though an absolute leak-proof joint is not essential since the working of the device is not prejudiced to an appreciable extent by slight leakage between the two chambers.

Communication between the chambers is effected by one or more passages 9 which connect the face of the body next the bottle chamber with the outer face and are controlled by the one-way device. Such one-way device or valve may be of any suitable type conveniently one made of rubber or the like elastic material to move in the manner of a flap to open or seal the outer ends of the passages 9 at the appropriate times.

The rubber disc 10 is suitably anchored e. g. by a central pin 11 of non-corrosive metal, hard rubber, or other suitable material or compound, of which also the body may be fabricated. At the outer end of the pin is formed a peripheral groove 12 in which lies the centrally-perforated disc, while at its inner end the pin is provided with a retaining head 13. This construction provides for quick and easy assembly or dis-assembly of the three parts for cleaning, the disc being taken off the pin and the pin withdrawn from the hole in the body.

This modification is intended for use with an air inlet at the opposite end of the body or other place operating in the known manner. When the teat is squeezed by the mouth of the infant or other recipient, the valve prevents passage of food back into the bottle so that food is forced through the teat delivery orifice even though the latter would be much too small when used in the ordinary suction manner. When the teat chamber enlarges by release of external pressure from its walls, the valve opens and food flows into the teat chamber ready for delivery by the next successive contraction, air entering the reservoir through the air inlet mentioned. In the absence of active movement of the teat walls, food does not flow from the reservoir into the teat chamber, so in these conditions, flow is stopped. The arrangements described adapt the elastic-walled teat to function in the manner of a diaphragm pump, a novel and useful effect in its application to feeding bottles.

As already adumbrated, a further development of the invention consists in an arrangement by which air may be passed into the bottle via the teat, enabling the separate customary air inlet to be dispensed with. Attempts have been made to avoid the drawing-in of air with the food, and the present invention is distinguished therefrom by a separation of air and liquid. As with the means described, the device is made for fitting to or as an integral part of the bottle, and positioned preferably but not necessarily in or in the vicinity of the teat end of the bottle.

Such device has two valve or one-way functions, one of which operates to pass air from the teat chamber into the bottle chamber but prevents passage of liquid food or air or both from the bottle chamber into the teat chamber, while the other operates in the manner described in connection with the first embodiment, i. e. food may flow from the bottle chamber into the teat chamber at the appropriate times but is prevented from flowing in the opposite direction.

According to a construction adapted to pass air via the teat illustrated in Figures 6–11 of the drawing, the body 1, liquid non-return valve 10 and central holding pin 11 may be generally similar to those in Figure 1. The air non-return valve 14 may be also a rubber disc seated on the inner end face of the taper plug 6, but the axial passages 9 may be modified. The holes say four in number are covered at their ends by the two discs, and conveniently three of the holes are grooved laterally at their inner ends 15 to allow passages of liquid to the outer valve 10, while the remaining hole is grooved laterally at its outer end 16 to allow access of air to the inner valve 14. The latter can be mounted on the common central pin 11, with the assembly made in the manner described. Obviously, any other suitable arrangement of passages and valve mounting may be used.

To withdraw food from the bottle, air of equal or substantially equal volume must be admitted, and the delivery orifice of the teat can be enlarged if desired to a size somewhat larger than usual. Assuming a condition in which the teat chamber contains liquid, or liquid at the lower part and air at the upper part, it will be clear that until the teat chamber is contracted, liquid cannot flow from the teat chamber under the effect of gravity since the valves are closed and there is sufficient resistance to flow offered by the said valves. Contraction of the teat chamber produces two actions; one, opening of the air valve by the pressure of compressed air which may be present in the upper part of the teat chamber, and consequent release of air through the food in the bottle to the space above the stored food; another, expulsion of the food through the teat delivery orifice. To open the air valve at this stage, the resistance to flow of liquid through the teat delivery orifice is such as to approximate the pressure needed to open the air valve.

At the termination of the food delivery movement, contracting pressure being removed from the elastic walls of the teat allows it to enlarge to its normal size. Two actions also accompany this enlarging movement; one is concerned with air and the other with liquid. Air enters through the teat orifice and collects in the upper part of the teat chamber, though some may pass the air valve into the bottle, and concurrently liquid descends under gravitational influence and pressure difference from the bottle reservoir via the liquid valve into the teat chamber, due to the difference in pressure in the two chambers. When, and not until, the walls of the teat chamber are collapsed, delivery of food from the teat through the outlet orifice commences under pressure, and the cycle is repeated. Flow of milk from the teat occurs only when the teat is being actively operated, which is an important advantage since should the recipient fall asleep, with cessation of active operation, the flow is stopped.

In a constructional variation, the valve or valves is or are made as integral parts of the plug as depicted in Figure 12 wherein slits 17, 18 are formed in a rubber or composition body 19 to place into or out of communication moulded passages 9 with the two chambers respectively, and operate in the same way as separately-made valves.

In lieu of or in addition to the valves may be used means which yield a similar effect, such as a fine aperture 20 Figure 6 in the air non-return flap 14 which because of the higher rate of flow of air, will pass sufficient air, but will discourage or prevent appreciable flow of liquid.

A modification of the two valve construction of Figure 6 is depicted in Figure 13 wherein a very fine groove or slit 21 is formed in the valve seat covered by the valve 10 to place into communication the bottle chamber 4 and the teat chamber 5 via the aperture 9 and allow passage of air. Thus the construction is simplified while the effect is that of two valves.

Having thus described my invention, what I claim is:

1. A device for use in connection with feeding bottles having an elastic-walled teat, comprising a fitment for application to the mouth of the bottle to divide the bottle and the teat into two chambers, a passage or passages connecting the inner and outer parts of the fitment, a non-return valve associated with said passage or passages to allow flow of liquid food from bottle to teat but to prevent return of liquid to the bottle, and means for passage of air through the fitment, said means allowing air to pass from the teat to the bottle, but substantially preventing passage of liquid from teat to bottle, said parts operating so that the teat when alternately extended and contracted operates as a force pump to deliver liquid through the teat delivery orifice or orifices.

2. A device for use in connection with feeding bottles having an elastic-walled teat, comprising a fitment for application to the mouth of the bottle to divide the bottle and teat into two chambers, a passage or passages connecting the inner and outer parts of the fitment, a non-return valve associated with said passage or passages to allow flow of liquid from the bottle to the teat but to prevent return of liquid to the bottle, an air passage or passages through said fitment, said air passage or passages being of a cross-section which allows air to pass from the teat to the bottle but substantially prevents passage of liquid from teat to bottle, said parts operating so that the teat when alternately extended and contracted operates as a force pump to deliver liquid through the teat delivery orifice or orifices.

3. A device for use in connection with feeding bottles having an elastic-walled teat, comprising a plug for insertion in the mouth of the bottle and adapted to be held in place by said teat, a liquid non-return valve at the inner face of said plug, a liquid passage or passages through the body of the plug controlled by said valve, an air passage or passages through the said plug, and a fine groove or hole connecting the air passage with the part of the plug remote from the bottle, said fine groove or hole being adapted to pass air but substantially prevent passage of liquid.

4. Plug according to claim 3 wherein the fine air groove or hole is formed in the seating of the liquid non-return valve.

5. Feeding bottle device comprising a liquid-food reservoir, a contractible and expansile chamber formed by an elastic-walled teat applied to the mouth of the bottle and fed by gravity from the reservoir, a liquid one-way device interposed between the reservoir and the teat and constructed so as to be self-closing against the gravital pressure of the liquid in the reservoir, and means for admittance of air to the reservoir, said parts operating so that extension of the teat opens the one-way device to produce a characteristic flow of liquid from reservoir to teat while the air admittance means allow air to enter the reservoir, and contraction of the teat by the lips and mouth of the feeder forces liquid from the teat delivery orifice or orifices.

CECIL HUGHES.